United States Patent
Gupta

(10) Patent No.: US 7,953,427 B1
(45) Date of Patent: *May 31, 2011

(54) COMMUNICATION ACCESS APPARATUS SYSTEMS, AND METHODS

(75) Inventor: Vivek G. Gupta, Portland, OR (US)

(73) Assignee: Marvell International, Ltd., Hamilton (BM)

( * ) Notice: Subject to any disclaimer, the term of this patent is extended or adjusted under 35 U.S.C. 154(b) by 277 days.

This patent is subject to a terminal disclaimer.

(21) Appl. No.: 12/149,438

(22) Filed: May 1, 2008

Related U.S. Application Data

(63) Continuation of application No. 10/782,474, filed on Feb. 19, 2004, now Pat. No. 7,373,111.

(51) Int. Cl.
*H04B 7/00* (2006.01)

(52) U.S. Cl. ..... 455/509; 455/41.3; 455/515; 455/556.1

(58) Field of Classification Search .......... 455/41.3, 455/515, 509, 90.3, 111, 557, 177.1, 186.1, 455/575.1, 550.1, 333, 270, 282, 66
See application file for complete search history.

(56) References Cited

U.S. PATENT DOCUMENTS

| | | | |
|---|---|---|---|
| 5,425,022 A * | 6/1995 | Clark et al. | 370/360 |
| 5,621,913 A | 4/1997 | Tuttle et al. | |
| 6,421,754 B1 * | 7/2002 | Kau et al. | 710/261 |
| 6,718,163 B2 * | 4/2004 | Tandy | 455/90.2 |
| 6,942,157 B2 | 9/2005 | Nozawa et al. | |
| 7,050,763 B2 * | 5/2006 | Stengel et al. | 455/90.3 |
| 7,107,019 B2 | 9/2006 | Tandy | |
| 7,373,111 B2 * | 5/2008 | Gupta | 455/41.3 |
| 2003/0232598 A1 * | 12/2003 | Aljadeff et al. | 455/41.2 |
| 2004/0030859 A1 | 2/2004 | Doerr et al. | |

* cited by examiner

Primary Examiner — Tan Trinh

(57) ABSTRACT

An apparatus and a system, as well as a method and article, may operate to reserve access for a source device included in a plurality N of source devices to N−1 logical channels accessible by a set of target devices included in the plurality of source devices by creating a static map, wherein N is a positive integer.

14 Claims, 3 Drawing Sheets

COMMUNICATION ACCESS APPARATUS SYSTEMS, AND METHODS

INCORPORATION BY REFERENCE

This is a Continuation of application Ser. No. 10/782,474 filed Feb. 19, 2004. The entire disclosure of the prior application is hereby incorporated by reference herein in its entirety.

BACKGROUND

Various embodiments described herein relate to communications generally, such as apparatus, systems, and methods used to transmit and receive information, including data packets.

SUMMARY

A single physical apparatus (e.g., a cellular telephone or a laptop computer) may include several devices (e.g., hardware components, software components, an application subsystem, a communication subsystem, etc.) that may be connected together by a multi-drop link such as a mobile scalable link (MSL). Each device may have access to a limited number of multiple independent logical channels to communicate with other devices. When communication between a source device and a target device occurs, the source device may be used to allocate to the target device a specific set of channel numbers. Until this happens, the channels used for communication between a selected pair of devices may be unknown.

In some apparatus, an arbitration scheme may be used to establish channel ownership and use. However, this may result in limiting the amount of data (e.g., 32 bytes) that can be sent over any channel before the quantum of communication time allotted comes to an end. The source device may then have to give up the link for use by another source device, such that transmission of large packets within the apparatus is split across several time slots. Additional delay may result when other source devices are not be permitted to transmit data to the same channel of the target device until the target device has completely received all portions of the packet (e.g., to eliminate the need to parse individual chunks of the packet, which is perhaps an even slower process).

DETAILED DESCRIPTION OF EMBODIMENTS

Figure 1:
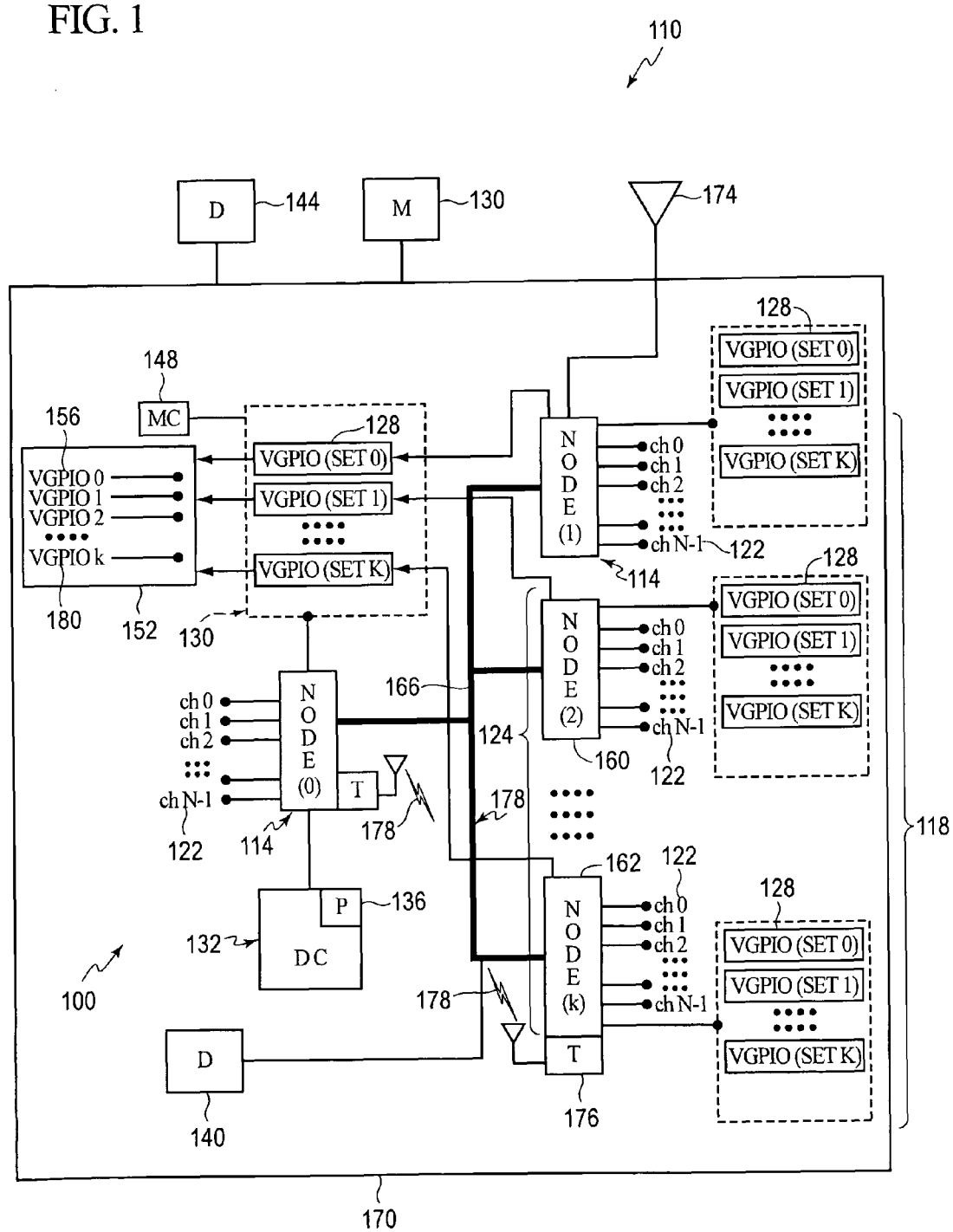
FIG. 1 is a block diagram of an apparatus and a system according to various embodiments.

Prior to communicating information, a set of common virtual general-purpose input-outputs (VGPIOs) may be allocated between each pair of communicating source and target devices. The number of actual VGPIOs in each set may be limited by the maximum number of channels that can be used for communication between a pair of devices. Thus, if there are "N" devices in a particular apparatus or system, perhaps a set of N-1 VGPIOs may be set aside for access by the other devices with respect to each device. Therefore, each source device may inform each target device as to what subset of the N-1 VGPIOs it plans to use for a particular communication scenario (e.g., for communication between source device A and target device B) by mapping channels to the appropriate VGPIOs. Target devices can also allocate channels for use between devices, further defining the existing communication links.

In some embodiments, each source device may allocate a set of VGPIOs for each target device with which it communicates within the apparatus or system. A static map of the links between source and target devices, listing the VGPIOs to be used in each case, may be established prior to the occurrence of any communication. Such static mapping may establish a simplified, deterministic communication scheme and avoid the use of a complicated dynamic mechanism that can produce race conditions.

In this environment, devices can map channel numbers onto VGPIOs in a given set. Thus, for example, channel 0 can correspond to VGPIO 0, channel 1 can be mapped to VGPIO 1, and so on. Similarly, channel 1 may be mapped to VGPIO 0, and channel 0 may be mapped to VGPIO 1. Other channel and VGPIOs may be similarly mapped for a given set.

The static mapping information for a group of source and target devices may be spread out in a distributed manner. Each pair of source and target devices can then have access to their corresponding static mapping information, a priori. The static mapping information may be stored in one or more memories, or in some other location(s). Each source device may be limited to knowledge of a local static map pertaining only to its own resource (e.g., VGPIO, channel) information. In some embodiments, there may be rules established by which different source devices do not operated to infringe on the channels of other source devices, outside of the static map information.

Source devices may communicate to target devices the channel numbers that have been allocated to them for use. Thereafter target devices can use allocated channels for communication. Target devices may then set and clear respective VGPIOs (in the VGPIO set of the source device) based on the channels they plan to use. Such implementations may be particularly useful in tightly integrated, system-in-package solutions, where applications processors, communications subsystems, cameras, storage devices, etc. form separate nodes in a cellular telephone apparatus, for example. Multi-drop environments, where a need exists to establish communication links between devices in an efficient and deterministic manner, may also benefit.

For the purposes of this document, the term "VGPIO" includes a communication channel, a software or hardware port, and/or one or more physical pins, or any other element (e.g., a wireless communication channel supporting communication via carrier waves) that can be used to couple one device to another as a conduit for communication between them.

FIG. 1 is a block diagram of an apparatus 100 and a system 110 according to various embodiments, each of which may operate in the manner described above. For example, an apparatus 100 may include a source device 114 included in a plurality N of source devices 118 having access to N-1 logical channels 122 accessible by a set of target devices 124 included in the plurality of source devices 118 according to a static map 128. The source device 114 may include many different elements, and it may be selected from many different device types, including one or more of a personal digital assistant, a desktop computer, a laptop computer, a cellular telephone, a device capable of communicating over a wireless local area network (WLAN), a software module, a hardware module, an applications subsystem, and a communications subsystem.

A portion of the static map 128 (or all of it) may be stored in one or more memories 130 (perhaps included in the apparatus 100, but also possibly located external to the apparatus 100) and may be altered dynamically by any one of several entities, including one or more of the source devices 114, the target devices 124, a device controller 132, a software program 136, an embedded device 140, an external device 144, and a memory controller 148. The static map 128 may include a channel map 152 to map a subset 156 of the N−1 logical channels 122 to a set of channels accessible to one or more of the target devices 160, 162 included in the set of target devices 124.

Many embodiments may be realized. For example, the apparatus 100 may include a multi-drop link 166 (e.g., an MSL) to couple the plurality N of source devices 118 to the set of target devices 124. The plurality N of source devices 118 may be included in a single physical device 170, such as a laptop computer, cellular telephone, personal digital assistant, vehicle(s), etc. In some embodiments, a source device 118 may operate substantially simultaneously as a target device 124.

Communications over various channels included in the N−1 logical channels 122 maybe conducted as defined by an IEEE (Institute of Electrical and Electronic Engineers) 802.11 standard. For more information regarding the various IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments.

Still other embodiments may be realized. For example, a system 110 may include an apparatus 100, as well as an antenna 174 coupled to at least one of the plurality of source devices 118. The antenna 174 may include an omnidirectional, monopole, dipole, patch, or directional antenna, among others.

A transceiver 176 may be included in one or more of the target and/or source devices (e.g., the plurality of source devices 118), and the system 110 may include one or more energy conduits (e.g., to support the transmission and reception of a carrier wave, such as a wire, fiber optic media, atmosphere, multi-drop link, etc.) 178 to couple one or more of the source devices 114 to one or more of the target devices 124.

Channel mapping is very flexible within the apparatus 100 and/or the system 110. Many possibilities may be entertained. For example, in addition to using the channel map 152 to map a first subset 156 of the N−1 logical channels 122 to a set of channels accessible to one or more of the target devices 160, 162 included in the set of target devices 124, the channel map 156 may be used to map a second subset 180 of the N−1 logical channels not including the first subset 156 of logical channels to a set of channels accessible to one or more of the target devices 160, 162 included in the set of target devices 124. Thus, each target device 160, 162 may have a separate channel map 152.

Other subsets of the N−1 logical channel set may also be designated and mapped. For example, each device may have multiple VGPIO sets as indicated by the static map 128. Each VGPIO set may have a selected number of VGPIOs that are mapped to channels as indicated by the channel map 152. In some embodiments, each VGPIO set on a source device may be selected for use by only one target device.

The apparatus 100, system 110, source devices 114, plurality N of source devices 118, N−1 logical channels 122, set of target devices 124, static map 128, memory 130, device controller 132, software program 136, embedded device 140, external device 144, memory controller 148, channel maps 152, subset of the N−1 logical channels 156, target devices 160, 162, multi-drop link 166, physical device 170, antenna 174, transceivers 176, energy conduits 178, and second subset of channels 180 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 100 and the system 110, and as appropriate for particular implementations of various embodiments.

It should also be understood that the apparatus and systems of various embodiments can be used in applications other than for devices communicating over an MSL, and other than for wireless systems, and thus, various embodiments are not to be so limited. The illustrations of an apparatus 100 and system 110 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants, workstations, radios, video players, vehicles, and others. Still other embodiments may be realized. For example, many embodiments include a variety of methods.

Figure 2:
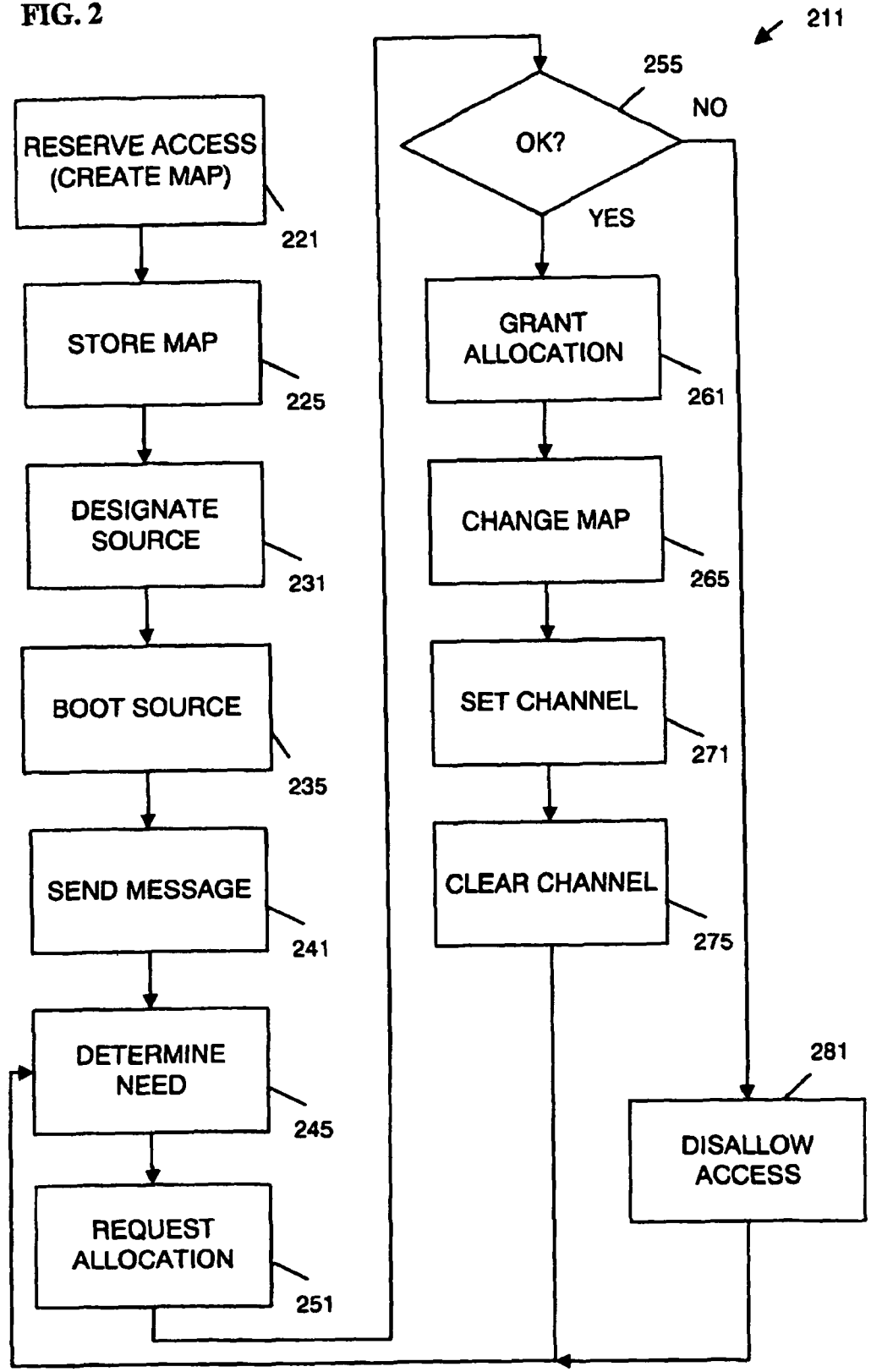
FIG. 2 is a flow chart illustrating several methods according to various embodiments.

FIG. 2 is a flow chart illustrating several methods according to various embodiments. Thus, in some embodiments of the invention, a method 211 may (optionally) begin at block 221 with reserving access for a source device included in a plurality N of source devices to N−1 logical channels accessible by a set of target devices included in the plurality of source devices by creating a static map. N may be a positive integer, and in some embodiments, N may be limited to greater than or equal to about 2.

The method 211 may continue with storing the static map in a memory (which may be coupled to the source device—see FIG. 1) at block 225, designating the identity of the source device within the plurality of source devices at block 231 (perhaps using an arbitration scheme), and then booting (or waking up) the source device at block 235. The method 211 may also include sending a message having an indication of the N−1 logical channels from the source device to at least one of the target devices included in the set of target devices at block 241.

In some embodiments, the method 211 may include determining the need for a channel by a target device included in the set of target devices at block 245, as well as requesting allocation of a channel from the source device by the target device as needed (at block 251). If the source device determines the allocation will be permitted, the method 211 may include granting the allocation of the channel to the target device by the source device at blocks 255 and 261. If the allocation is granted (and for other reasons), the method 211 may include changing the static map responsive to an indication received from one of several entities, such as an entity selected from the source device, a target device included in the set of target devices, a device controller, a software program, an embedded device, an external device, and a memory controller at block 265.

The method 211 may include allowing (by the source device) the setting of one or more channels, and then setting one or more channels by a target device included in the set of target devices at block 271. The method may also include disallowing (by the source device) the setting of one or more channels by a target device (see the reference to block 281, below). The method 211 may include clearing the set channels by the target device at block 275. It should be noted that in some embodiments, target devices may be limited to clearing only channels that have been allocated to them. Thus, in some embodiments, multiple target devices cannot allocate the same channel.

Setting and clearing channels may be one of many mechanisms used to indicate to one or more source devices that the set channels are currently in use by a particular target device, so that such channels are not allocated to other target devices until they are cleared. The method 211 may go on to determine the need for channels by target devices included in the apparatus or system at block 245. If a channel allocation is not allowed at block 255, then access may be disallowed by the source device at block 281, and the method 211 may continue with determining the need for channels by target devices included in the apparatus or system at block 245. While access may be disallowed at block 281 in some embodiments, such requests may always be honored in other embodiments, in which case the source and target devices may communicate more efficiently as long as selected rules for requesting access are diligently observed.

Using the methods disclosed, multiple devices (source and target) may be connected and disconnected at will. Thus, some embodiments may include both source and target devices that are capable of sleeping and waking asynchronously, establishing communication links in a deterministic fashion, so that multiple devices can be added seamlessly into the operation of an apparatus or system.

It should be noted that the methods described herein do not have to be executed in the order described, or in any particular order. Moreover, various activities described with respect to the methods identified herein can be executed in serial or parallel fashion. Some activities may be repeated indefinitely, and others may occur only once. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment, including Hypertext Markup Language (HTML) and Extensible Markup Language (XML). Thus, other embodiments may be realized, as shown in FIG. 3.

Figure 3:
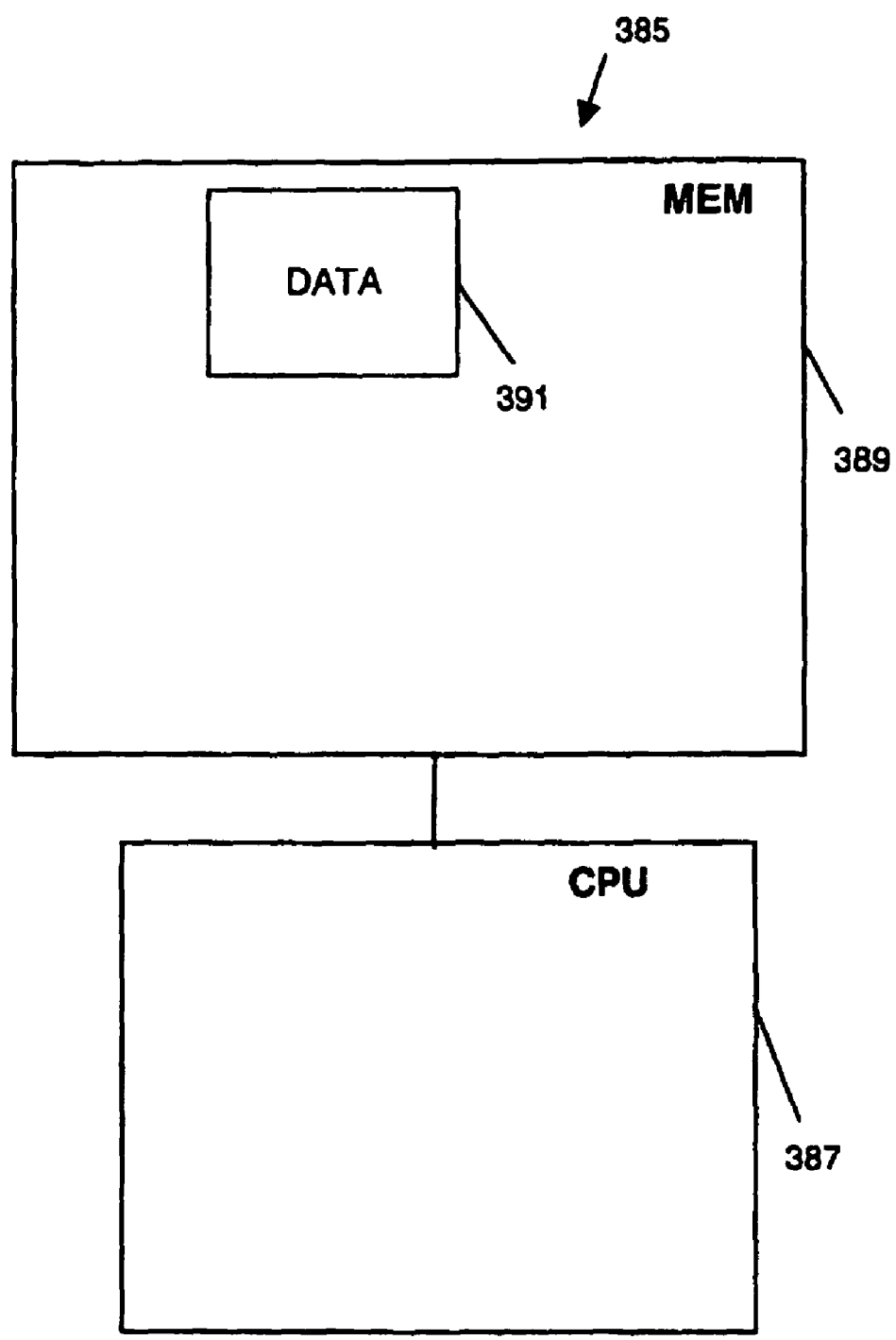
FIG. 3 is a block diagram of an article according to various embodiments.

FIG. 3 is a block diagram of an article 385 according to various embodiments, such as a computer, a memory system, a magnetic or optical disk, some other storage device, and/or any type of electronic device or system. The article 385 may comprise a processor 387 coupled to a machine-accessible medium such as a memory 389 (e.g., a memory including an electrical, optical, or electromagnetic conductor) having associated information 391 (e.g., computer program instructions, and/or other data), which, when accessed, results in a machine (e.g., the processor 387) performing such actions as reserving access for a source device included in a plurality of N source devices to N−1 logical channels accessible by a set of target devices included in the plurality of source devices by creating a static map.

Other activities may include storing the static map in a memory coupled to the source device, determining a need for one or more channels by a target device included in the set of target devices, and setting the needed channels by the target device. Further activities may include allowing the setting of one or more channels by the source device, and disallowing (by the source device) the setting of one or more channels.

Implementing the apparatus, systems, and methods described herein may result in reducing the need to parse chunks of fragmented packets received from multiple devices on a single channel, which may in turn diminish communications processing overhead. In addition, channels may be shared across devices while communication links are established deterministically, with bounded latency.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a static map that can be altered dynamically; and
   a plurality of N source devices having access to N−1 logical channels accessible by a set of target devices included in the plurality of source devices according to the static map.

2. The system according to claim 1, wherein
   the static map is altered dynamically when an additional target device is connected to or disconnected from the system.

3. The system according to claim 1, wherein
   the static map is altered dynamically when an at least one of the target devices enters into or exits out of a sleep mode.

4. The system according to claim 1, the static map comprising:
   a channel map that maps a first subset of the N−1 logical channels accessible to a first target device included in the set of target devices.

5. The system according to claim 4, wherein
   each target device includes a respective channel map.

6. The system according to claim 1, further comprising:
   a transceiver included in at least one of the target devices; and
   an energy conduit to couple at least one of the source devices to at least one of the target devices.

7. The system according to claim 6, wherein
   the plurality of N source devices are all included in a single physical device.

8. An apparatus comprising:
   a memory storing a static map that can be altered dynamically; and
   a source device included in a plurality of N source devices having access to N−1 logical channels accessible by a set of target devices included in the plurality of source devices according to the static map.

9. The apparatus according to claim 8, wherein
   the static map is altered dynamically when an additional target device is added to the set of target devices.

10. The apparatus according to claim 8, wherein
    the static map is altered dynamically when an at least one of the target devices enters into or exits out of a sleep mode.

11. The apparatus according to claim 8, the static map comprising:
    a channel map that maps a first subset of the N−1 logical channels accessible to a first target device included in the set of target devices.

12. The apparatus according to claim 8, wherein the source device includes at least one of a personal digital assistant, a desktop computer, a laptop computer, a cellular telephone, an applications subsystem and a communications subsystem.

13. The apparatus according to claim 8, further comprising:
    an omnidirectional antenna coupled to the source device.

14. The apparatus according to claim 8, further comprising:
    a memory controller that dynamically alters the static map.

* * * * *